United States Patent [19]
Boersma

[11] Patent Number: 5,201,545
[45] Date of Patent: Apr. 13, 1993

[54] STEERING SHAFT FOR MOTOR VEHICLES

[75] Inventor: Sape J. Boersma, Bludesch, Austria

[73] Assignee: Etablissement Supervis, Vaduz, Liechtenstein

[21] Appl. No.: 820,092

[22] Filed: Jan. 13, 1992

[30] Foreign Application Priority Data

Jan. 29, 1991 [DE] Fed. Rep. of Germany ....... 4102516

[51] Int. Cl.$^5$ ............................................. B62D 1/19
[52] U.S. Cl. ...................................... 280/777; 74/492; 188/376; 403/2; 403/24
[58] Field of Search ........................... 280/777; 74/492; 188/371, 376, 377; 403/2, 24

[56] References Cited

U.S. PATENT DOCUMENTS

| | | | |
|---|---|---|---|
| 3,752,007 | 8/1973 | Blondeleau et al. | 74/492 |
| 4,133,220 | 1/1979 | Wenninger | 74/492 |
| 4,156,372 | 5/1979 | Wenninger | 74/492 |
| 4,730,508 | 3/1988 | Haldric et al. | 280/777 |

Primary Examiner—Tamara L. Graysay
Attorney, Agent, or Firm—Anderson Kill Olick & Oshinsky

[57] ABSTRACT

A steering shaft for motor vehicles includes at least two shaft portions which are movable relative to each other in order to reduce the length of the steering shaft in case of an axial load due to an accident. The end portions of the shaft portions face each other and are located next to each other and are preferably angled or bent. Overlapping flanges are mounted on the end portions. In the overlapping areas, one of the flanges has bores which are equipped with sleeves of macromolecular materials. Guide bolts fastened to another flange extend into the bores. The free ends of the guide bolts project beyond the flange with the bores. Tearable stops are provided at the free ends of the guide bolts. The stops may be in the form of disks.

9 Claims, 3 Drawing Sheets

STEERING SHAFT FOR MOTOR VEHICLES

BACKGROUND OF THE INVENTION

1. Field of the Invention

The present invention relates to a steering shaft for motor vehicles. The steering shaft includes at least two shaft portions which are movable relative to each other in order to reduce the length of the steering shaft in case of an axial load due to an accident. The end portions of the shaft portions facing each other are arranged so as to be located next to each other and are preferably angled or bent. Overlapping flanges are mounted on the end portions. In the overlapping areas, the flanges have bores which are equipped with sleeves made of macromolecular materials. Guide bolts fastened to another flange extend into the bores. The free ends of the guide bolts project beyond the flange with the bores.

2. Description of the Related Art

It is known in the art to construct steering shafts of motor vehicles whose one end is connected to a steering gear system and whose other end is connected to a steering wheel in such a way that the length of the steering shaft is reduced when an axial load occurs due to an accident.

In a construction known from U.S. Pat. No. 4,572,022, the steering shaft is composed of a shaft portion constructed as a tubular piece and of a profiled shaft portion which is telescopically received by the tubular piece. In an area overlapping the shaft portion, the tubular piece has indentations which engage in grooves of the profiled shaft portion which extend parallel to the axis of the shaft, wherein the indentations rest with initial tension against the grooves. This connection with indentations and grooves secures the two shaft portions against radial relative rotation. The above-mentioned initial tension ensures that the two shaft portions only move axially relative to each other in order to reduce the length of the steering shaft if the holding force between the two shaft portions obtained by the initial tension is exceeded by the axial load resulting from the accident.

Steering shafts of the type known from U.S. Pat. No. 4,572,022 have been found useful when they were involved in relatively minor accidents because it was still possible to steer the vehicle even after the steering shaft has become shorter after an accident. However, due to the structural components of the motor vehicle located in front of the driver of the motor vehicle, i.e., usually the engine compartment, the displacement distance of the two shaft portions of the steering shaft is limited, so that, in case of serious accidents, it is possible that injury resulting from a steering shaft entering in the driver compartment will occur, even if the length of the steering shaft is reduced.

Accordingly, it has been found useful to provide a steering shaft of the above-described type with an additional safety element. Thus, the two end portions of two shaft portions which face each other are arranged so as to be located next to each other and the end portions are angled or bent and overlapping flanges are fastened at these end portions. In the overlapping areas, the flanges have bores which are equipped with sleeves made of macromolecular materials. Guide bolts fastened to the other flange extend into the bores. The free ends of the end portions project beyond the flange with the bores. As a result, a steering shaft of the above-described type is provided in which the shaft portions can be displaced relative to each other and, thus, shortened to a substantial extent under load due to an accident, however, with the consequence that the motor vehicle can no longer be steered.

Steering shafts having the structural elements described above are known from U.S. Pat. Nos. 4,730,508, 4,156,372 and 4,133,220. The guide bolts which have a uniform diameter over the length thereof are received by sleeves which are made of macromolecular materials, for example, of rubber or of plastics materials. These materials have the purpose to act as damping means, on the one hand, and to keep the adjusted frictional values constant as much as possible over long periods of time, on the other hand, so that the selected forces at which the shaft portions move relative to each other are maintained essentially over the entire service life of the motor vehicle. The guide bolts project beyond the sleeves receiving the bolts only by a relatively small extent, so that, in case of collision, the components coupled in the above-described manner are separated from each other even if the length of the steering shaft is reduced by only a small extent. The separation of the components from each other has the consequence that the motor vehicle damaged by the accident can no longer be steered. This consequence occurs independently of whether one of the flanges has only guide bolts and the other of the flanges has only sleeves for the guide bolts, or if each flange has guide bolts as well as the sleeves. If, in case of collision, the contact friction between guide bolts and sleeves is exceeded, a uniform sliding friction resistance must be overcome over the entire displacement distances.

In another steering shaft of the above-described type known from German Offenlegungsschrift 19 27 173, one of the shaft portions is guided in the flange of the other shaft portion. The purpose of this configuration is to avoid that, after separation of the coupling, the shaft portions which become free move in an uncontrolled manner and cause additional damage. While this known steering shaft substantially meets this object, there is also the problem in this case that the vehicle can no longer be steered even if the length of the steering shaft is reduced by only a small extent.

SUMMARY OF THE INVENTION

Therefore, it is the object of the present invention to provide a steering shaft for motor vehicles which avoids the disadvantages described above. Specifically, it is the object of the present invention to ensure in a steering shaft of the type described initially that the connection of the shaft portions is not separated when only a small load due to an accident acts on the steering shaft and, consequently, the vehicle can still be steered when the length of the steering shaft begins to be reduced.

In accordance with the present invention, the above-described object is met by providing tearable stops at the free ends of the guide bolts. For example, the stops may be in the form of disks.

As a result of the feature according to the present invention, it is ensured that, in case of a slight load due to an accident, the length of the steering shaft is reduced before forces occur of such a magnitude that the above-mentioned stops are torn off, so that the connection between the shaft portions is separated.

However, if the steering shaft is composed of shaft portions whose lengths cannot be reduced, another feature of the present invention provides that the part of the guide bolt projecting beyond the flange has at least the same length as the sleeve through which the bolt extends and the diameter of the projecting part of the guide bolt is smaller than the diameter of that part of the guide bolt which is received by the sleeve. The improvement of a steering wheel of this type is the fact that, after a first length reduction of the steering shaft in case of collision of the vehicle, the vehicle still remains steerable and, after the contact friction between guide bolt and sleeve has been overcome, for any further length reduction of the steering shaft practically no force has to be applied or only a force has to be applied which decreases with increasing length reduction of the steering shaft. Only in the case of a serious and harmful collision will the above-described stops be torn off and the coupling between the shaft portions be entirely separated.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
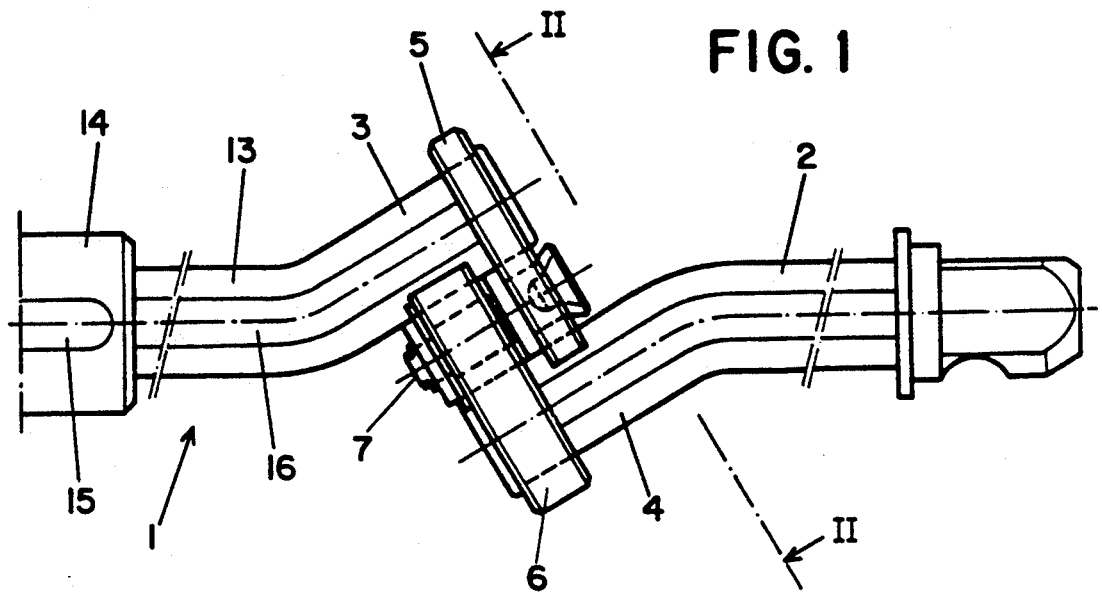
FIG. 1 is a side view of a first embodiment of the steering shaft according to the present invention.
Figure 3A:
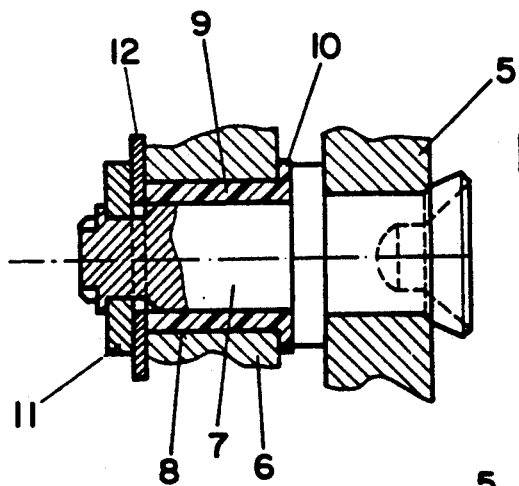
FIG. 3a is a longitudinal sectional view, on a larger scale, of the guide bolt and the sleeve receiving the guide bolt.
Figure 2:
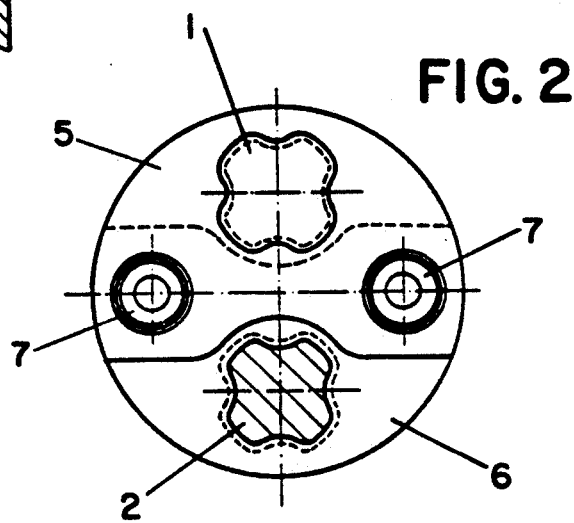
FIG. 2 is a sectional view taken along sectional line II—II of FIG. 1.
Figure 3B:
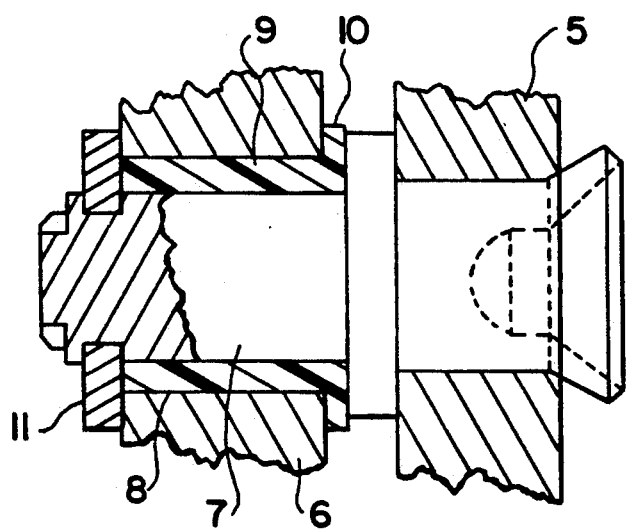
FIG. 3b is a schematic longitudinal sectional view, on a larger scale, of the guide bolt and the sleeve receiving the guide bolt.
Figure 4:
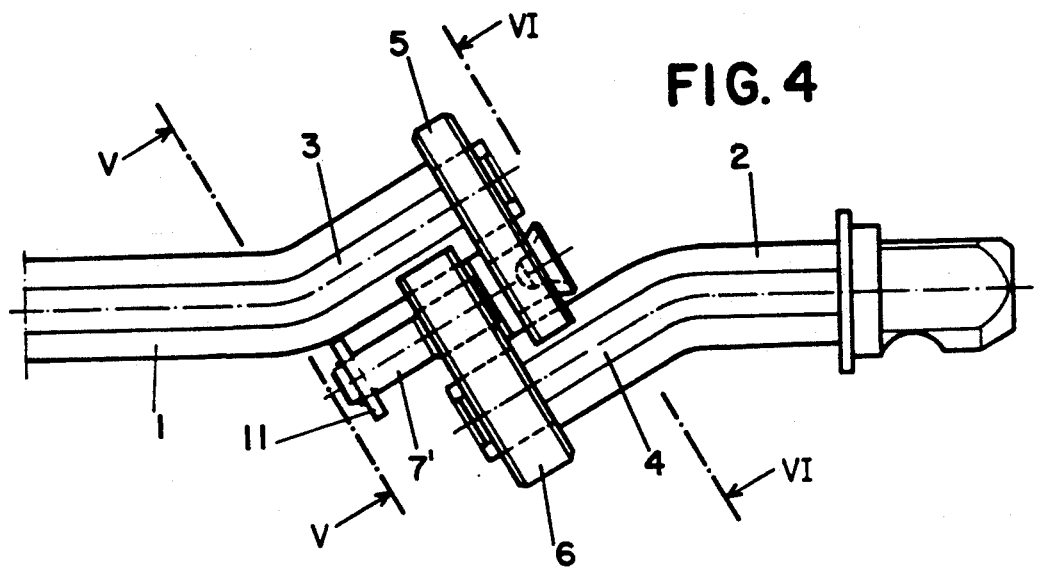
FIG. 4 is a side view of a second embodiment of the steering shaft of the present invention.

In the drawing, the equivalent components of the two embodiments of the steering wheel of the present invention are designated by the same reference numerals.

The steering wheel includes two shaft portions 1 and 2 which are arranged successively in axial direction. The shaft portions 1 and 2 have angled or bent end portions 3 and 4 which face each other and are located next to each other. Flanges 5 and 6 are fastened to the end portions 3 and 4, respectively. The flanges 5 and 6 overlap each other partially. A pair of guide bolts 7 are fastened in the overlapping area of flange 5. The guide bolts 7 of flange 5 extend through bores 8 which are provided in the overlapping area of the other flange 6. The bores 8 are equipped with sleeves 9 which are made of a macromolecular material, for example, plastics material. On the side facing the flange 5, the sleeves have a support collar 10 for facilitating the assembly.

The outer diameter of the part of the guide bolt 7 received in the sleeve 9 and the inner diameter of the sleeve 9 are dimensioned in such a way that a press fit exists between these two components. The tolerances of this press fit are selected such that the specific contact surface pressure of the adjacent surfaces is below a value which could lead to yielding of the material of the sleeve 9.

A disk-shaped intermediate layer 12 of macromolecular material is slid onto the part of the guide bolt 7 which projects by a small extent beyond the flange 6. A disk 11 which serves as a stop rests directly against the flange 6 or intermediate layer 12. The disks 11 are secured by calking the end faces of the guide bolts 7.

The shaft portion 1 is constructed telescopically in two parts. One part 13 is formed by a profiled rod and the other part by a tubular piece 14 which has indentations 15 which engage under initial tension in grooves 16 of the part 13.

In case of a collision in which the forces resulting from the accident are still relatively small, initially the length of the shaft portion 1 is reduced as a result of the parts 13 and 14 sliding into each other. However, when the forces resulting from an accident are high, not only the parts 13 and 14 are fully slid into each other to reduce the length of the steering shaft, but additionally the disks 11 serving as stops are torn off, so that the coupling of the shaft portions is entirely separated which, however, has the consequence that the vehicle can no longer be steered.

The embodiment illustrated in FIGS. 4–7 substantially corresponds to the embodiment discussed above.

However, in the embodiment of FIGS. 4–7, the shaft portions 1 and 2 have a predetermined length. The means for connecting the steering shaft to the steering wheel and to the steering gear unit are provided at the outer ends of the shaft portions 1 and 2. In this case, the guide bolts 7' have over the length thereof different diameter portions. The portion of the guide bolt 7' which is received by the sleeve 9 has the greater diameter.

The free portion of the bolt 7' which projects from the flange 6 has the smaller diameter and has a length which is greater than the length of the sleeve 9. A disk 11 each serving as a stop is fastened to the free end of the guide bolt 7'. The end faces of the guide bolts 7' are calked for securing the disk 11 and the disk 11 rests against a step-like shoulder with one of its sides against the free end of the guide bolt 7'.

Figure 7:
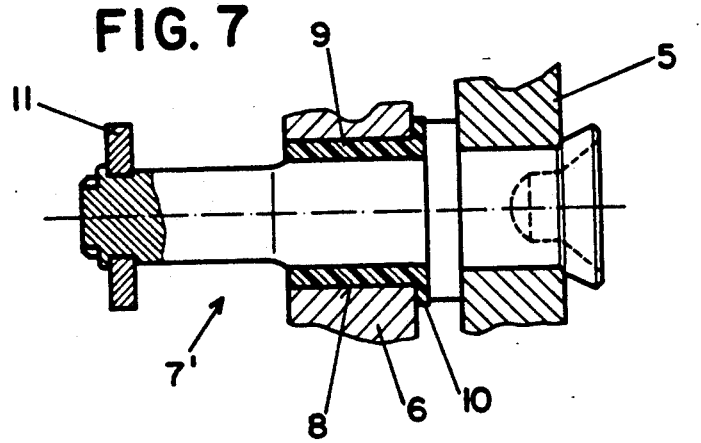
FIG. 7 is a longitudinal sectional view, on a larger scale, of the guide bolt and the sleeve receiving the guide bolt.
Figure 6:
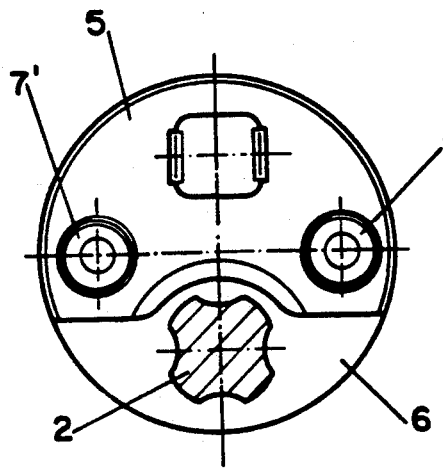
FIG. 6 is a sectional view taken along sectional line VI—VI of FIG. 4.
Figure 5:
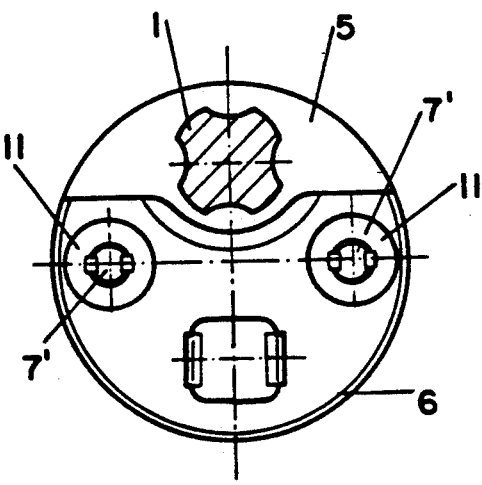
FIG. 5 is a sectional view taken along sectional line V—V of FIG. 4.

In case of a collision in which the length of the steering shaft is reduced only by a small extent, the guide bolt 7' is displaced toward the right as seen in FIG. 7. After the contact friction between the guide bolt 7' and the sleeve 9 have been overcome, the reduced diameter of the subsequent portion of the guide bolt means that a decreasing force is required for the displacement. The disk 11 which serves as a stop initially maintains the connection between the two shaft portions. The connection now has a play, however, the vehicle damaged by the accident can still be steered. However, if the collision is serious, so that the length of the steering shaft is reduced by a greater extent, the disks 11 serving as stops are torn off and it is only now that coupling between the two shaft portions is separated entirely.

In the illustrated embodiments, the guide bolts 7 and 7' are riveted in the flange 5. The circumferential flange of the guide bolt 7 and 7' provided between flange 5 and guide sleeve 9 serves only as an aid in the assembly.

In the illustrated embodiments, the two end portions 3 and 4 of the shaft portions 1 and 2 are angled. However, it is also conceivable to bend these end portions such that the end portions supporting the flanges extend at least approximately parallel to the shaft portions.

The solution proposed in accordance with the present invention represents a significant improvement of the above-described known constructions because all the objects mentioned above can be met.

While specific embodiments of the invention have been shown and described in detail to illustrate the inventive principles, it will be understood that the invention may be embodied otherwise without departing from such principles.

I claim:

1. In a steering shaft for motor vehicles including at least two shaft portions which are movable relative to each other for reducing the length of the steering shaft in case of an axial load due to an accident, each shaft portion having an angled end portion, the end portions of the shaft portions being mounted so as to face each other and being arranged so as to be located next to each other, overlapping flanges being mounted on each end portion, wherein, in overlapping areas of the flanges, one of the flanges has bores, sleeves of macromolecular material being mounted in the bores, and wherein guide bolts fastened to another of the flanges extend into the bores, free ends of the guide bolts projecting beyond the flange with the bores, the improvement comprising tearable stop members mounted at the free ends of the guide bolts.

2. The steering shaft according to claim 1, wherein the stop members are disks.

3. The steering shaft according to claim 2, wherein the disks rest against each flange.

4. The steering shaft according to claim 2, comprising an intermediate layer mounted on each free end between the disk and the flange.

5. The steering shaft according to claim 1, wherein a part of each guide bolt projecting beyond the flange with the bores has at least the same length as the sleeves in the bore, and wherein the part of the guide bolt projecting beyond the flange with the bores has a diameter which is smaller than the diameter of a part of the guide bolt which extends within the sleeve.

6. The steering shaft according to claim 1, comprising a press fit between sleeves and guide bolts.

7. The steering shaft according to claim 6, wherein the press fit has a tolerance such that a specific surface pressure between the sleeve and the guide bolt is below a value which leads to yielding of the macromolecular material of the sleeve.

8. The steering shaft according to claim 2, wherein the disks are fastened to the free ends of the guide bolts by calking.

9. The steering shaft according to claim 1, wherein at least one of the shaft portions comprises two members which are telescopically mounted one within the other.

* * * * *